Nov. 17, 1942.  E. W. DAVIS  2,302,423
ELECTRICALLY CONTROLLED OILING SYSTEM
Filed Oct. 7, 1940  4 Sheets-Sheet 1

Inventor:
Ernest W. Davis.
By Williams, Bradbury & Hinkle
Attys.

Nov. 17, 1942.  E. W. DAVIS  2,302,423
ELECTRICALLY CONTROLLED OILING SYSTEM
Filed Oct. 7, 1940  4 Sheets-Sheet 3

Inventor:
Ernest W. Davis
BY
Williams, Bradbury, & Hinkle
Attys.

Nov. 17, 1942.   E. W. DAVIS   2,302,423
ELECTRICALLY CONTROLLED OILING SYSTEM
Filed Oct. 7, 1940   4 Sheets-Sheet 4
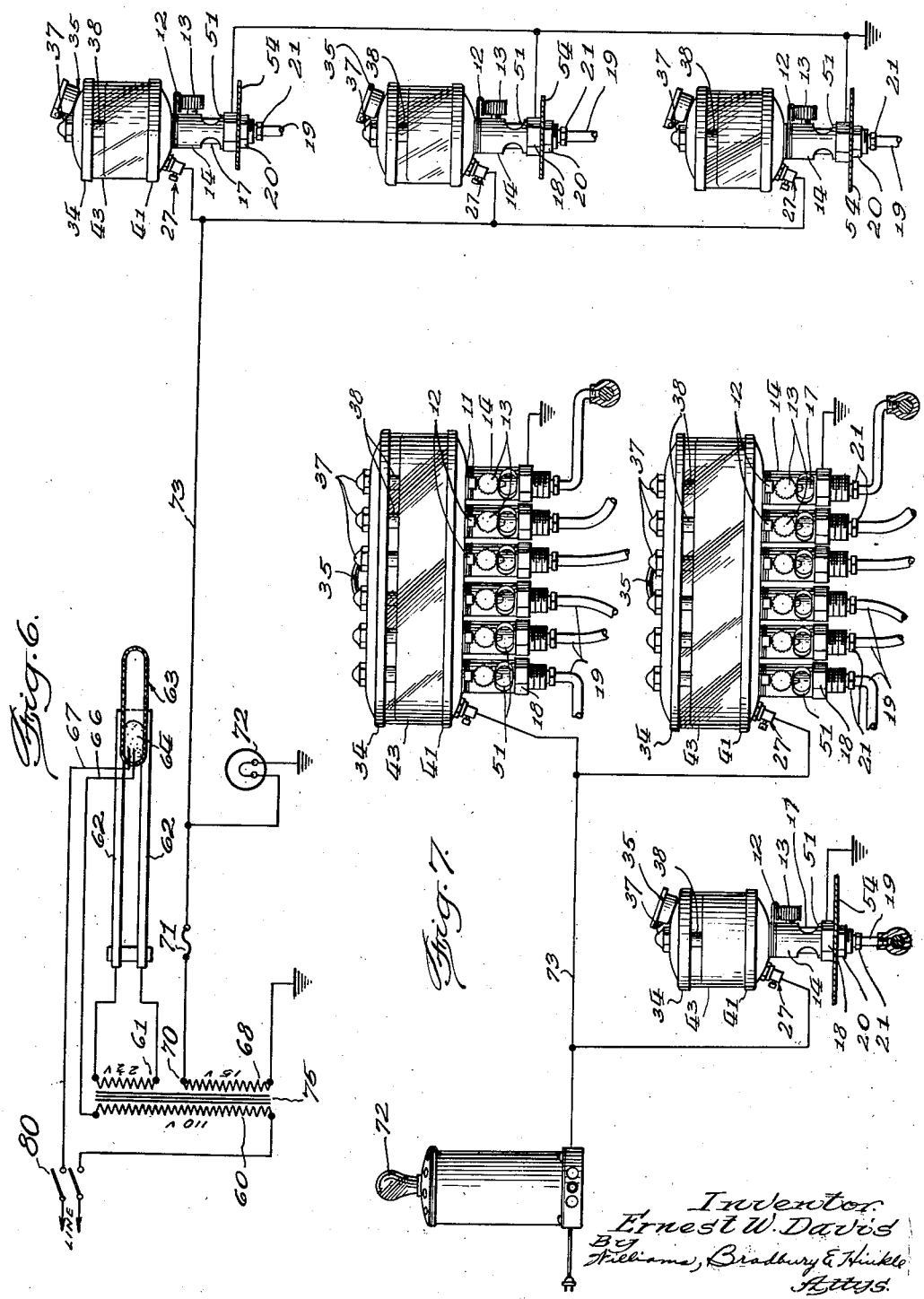

Patented Nov. 17, 1942

2,302,423

UNITED STATES PATENT OFFICE 2,302,423

ELECTRICALLY CONTROLLED OILING SYSTEM

Ernest W. Davis, Oak Park, Ill., assignor to Stewart-Warner Corporation, Chicago, Ill., a corporation of Virginia Application October 7, 1940, Serial No. 360,037

4 Claims. (Cl. 184—67)

My invention relates to an improved electrically controlled gravity flow oiling system for various types of machinery.

It is an object of my invention to provide a gravity flow oiling system which may be more accurately controlled at small rates of lubricant flow.

It is an object of my invention to provide an improved gravity flow oiling system which may be started and stopped automatically with the machinery which it lubricates.

It is an object of my invention to provide a gravity flow oiling system which will automatically provide for an increased initial flow of lubricant when the machine is started in operation.

It is an object of my invention to provide a gravity flow oiling system which will in part compensate for the tendency of such systems to over-lubricate as room temperature rises.

It is an object of my invention to provide intermittent discharges of oil from such an oiling system in an adjustable, accurately measured quantity at regularly recurring intervals of short duration.

It is an object of my invention to provide a gravity flow oiling system which need not be adjusted each time it is placed in operation.

It is an object of my invention to provide an automatic gravity flow oiling system which is more easily installed than other systems of the same type.

It is an object of my invention to prove an automatic gravity flow oiling system which is cheaper to manufacture than other systems of the same type.

It is an object of my invention to provide an automatic gravity flow oiling system which will save in operating cost and lubrication cost over former oiling systems of the same type.

Other objects will appear from the following description, reference being made to the accompanying drawings, in which:

Fig. 6 is a diagrammatic representation of the electrical control device and its connection with several single unit oilers in parallel, and Fig. 7 shows the electrical control device being used with two multiple oilers and a single oiler electrically connected in parallel.

Figure 1:
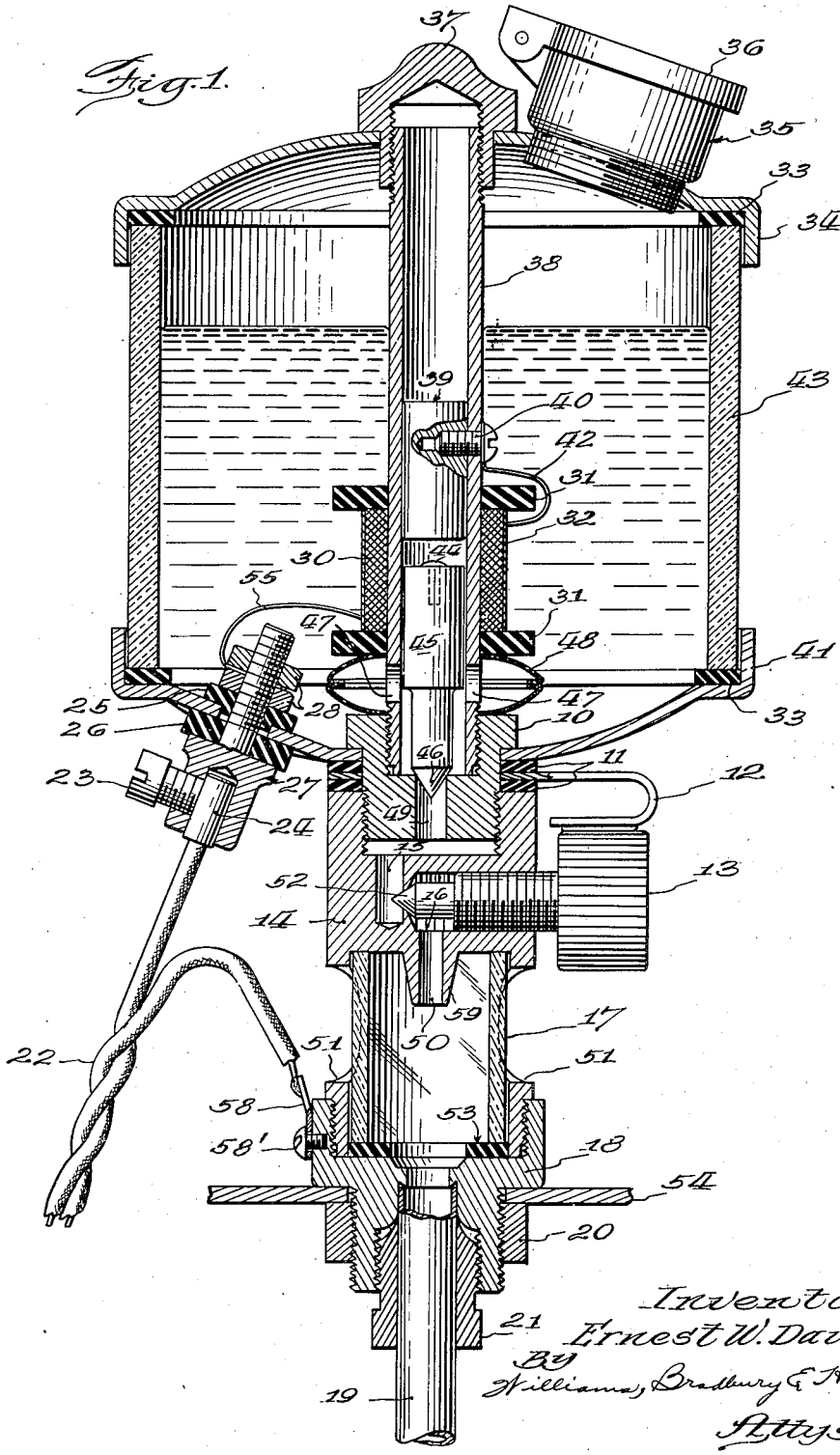
Fig. 1 shows a cross-sectional view of a unit electrically controlled gravity flow oiling device which forms a part of my invention.
Figure 2:
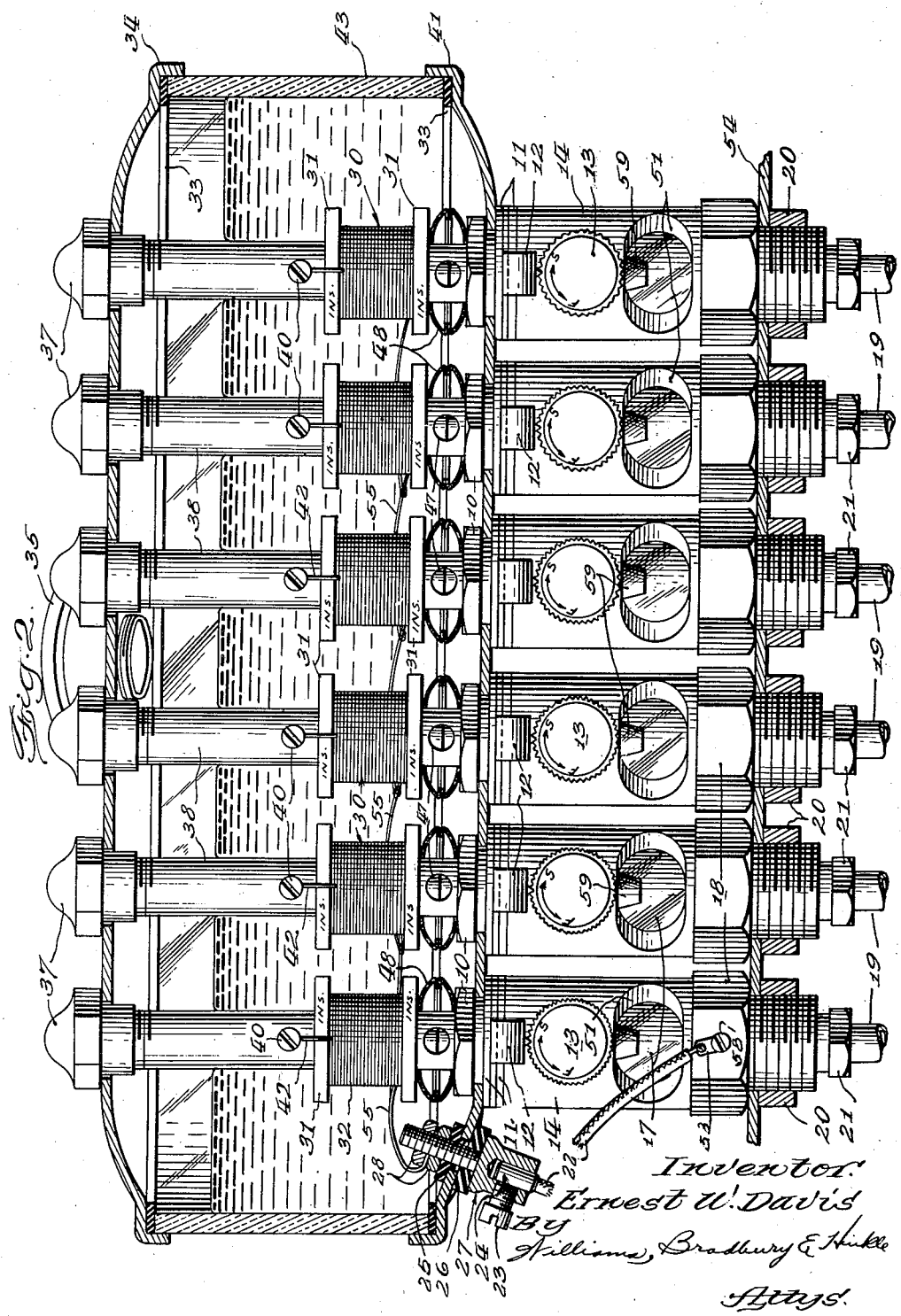
Fig. 2 shows a cross-section of a multiple electrically controlled gravity flow oiling device, comprising several unit oilers contained in a single oil reservoir for convenient adjustment, observation and filling, and suitable for installation where the various machine elements to be lubricated are located near together.

Referring to Fig. 1, a hollow cylindrical post 38 of non-magnetic material runs vertically through the center of the cylindrical oil reservoir. This post 38 is threaded on both extremities to receive fitting 10 and hexagonal cap 37. The lower end of the post 38 is provided with inlets 47 to allow lubricant to flow into the center of said post. A screen 48 is provided to keep foreign particles from entering the inlets 47. Tightening hexagonal cap nut 37 forces the cover of the oil reservoir 34 and the bottom of the oil reservoir 41 toward the ends of a transparent cylinder 43 which forms the body of the oil reservoir. Oil is prevented from leaking past the ends of the transparent cylinder 43 by gaskets 33. The reservoir may be filled through a fitting 35, provided with a spring hinged cap 36, and screwed into a hole in the cover 34 of the oil reservoir.

Inside the hollow post 38 is a cylindrical stop 39 of magnetic material held in position in said post by a screw 40. A generally cylindrical valve member 45 of a magnetic material is free to move in the center and along the axis of the central post 38. A small plug 44 of non-magnetic material is provided in the top of the valve member 45 to prevent it from sticking to the cylindrical stop 39 by residual magnetism. Valve member 45 is provided with a conical tip 46 which acts as a valve. In its lower position this tip closes a cylindrical passage 49 in the fitting 10, preventing the flow of lubricant through the oiler.

The lower end of fitting 10 is externally threaded and screwed into the base 14 of the oiler. The bottom 41 of the oil reservoir is firmly held between a shoulder on the upper portion of fitting 10 and the oiler base 14. Washers 11 prevent leakage at this connection. A drilled hole 15 extends a short distance downward into the oiler base 14 and is intersected by the extreme end of a horizontal drilled and tapped hole 16. A needle valve 52, on the end of a thumb screw 13 in tapped hole 16, regulates the rate of flow of the oil by adjusting the size of the opening between holes 15 and 16. A U-shaped flat spring 12 engages notches in the head of the needle valve 13 to prevent it from being accidentally turned.

A cylindrical passage 50 in the center of base 14 connects a threaded hole 16 with a tip 59 shaped to form drops of oil of uniform size. The formation of these drops may be observed through openings 51 which are covered by a cylinder of transparent material 17. A fitting 18 is screwed over the bottom of the oiler base 14. A gasket 53 insures a leak-proof joint between the transparent cylinder 17 and the fitting 18. The lower end of this fitting 18 is abruptly reduced in diameter and threaded. It extends through and closely fits a hole provided in a horizontal sheet 54 of metal or the like which supports the oiler. The oiler is firmly held in an upright position by a hexagonal nut 20 screwed onto the lower end of the fitting 18 and tightened against the lower side of the supporting sheet 54.

A fitting 21 is screwed into the bottom of fitting 18 to hold securely the outlet line 19 which connects the oiler with the machine element to be lubricated.

A solenoid winding 30 is placed around the lower end of the central post 38. This solenoid winding 30 is confined by collars 31 and protected by a covering 32. A binding post 27 is provided in the reservoir base 41 and electrically insulated therefrom by a non-conducting bushing 25, 26. This fitting 27 is threaded on its upper end to receive two nuts 28 which are tightened, holding the binding post 27 firmly to the reservoir bottom 41. One terminal of the solenoid winding 30 is grounded to the body of the oiler by a wire 42 held under screw 40. The other terminal of the solenoid winding 30 is connected with the solenoid control circuit by a wire 55, held to binding post 27 by nuts 28. The grounded terminal of the solenoid control circuit 22 is provided with a tip 58, which is tightly held to the fitting 18 by a screw 58'. The other terminal of the control circuit 22 is provided with a conducting cap 24 and is frictionally held in the binding post 27 by a set screw 23.

In operation electric current flows through the solenoid winding 30 and the electromagnetic effect causes the valve member 45 to move upward, thereby allowing oil to flow past valve 46. The oil flows through screen 43, through inlets 47 in the central post 38, past the solenoid control valve 46, through holes 49 and 15, past the adjustable needle valve 52, through passage 50, to tip 59 where it forms drops. These drops fall in the outlet line 19 and pass to the part to be lubricated.

The oiler control circuit may be arranged so that it is closed incidental to placing the machine to be lubricated in operation, and opened incidental to taking the machine out of operation. This safeguards the machine being lubricated from damage resulting from operation without lubricant and prevents loss of lubricant when the machine is not operated, thereby guarding against carelessness of the operator.

In previous similar oiling devices, the flow of lubricant could be stopped only by closing the needle valve. This necessitated a re-adjustment of the needle valve each time the oiler was placed in operation. In my device closing the control valve stops the flow of lubricant so that it is possible to keep the needle valve in more or less permanent adjustment.

Very small rates of flow through previous oiling devices of this type were obtained by adjusting the needle valve to a very small opening which was subject to continual clogging. When the present oiler is connected to an automatic control device which opens the control valve at regularly recurring intervals of short duration, the lubricant will be allowed to flow from the oiler a small but accurately determined fraction of the time and small average rates to flow may be obtained with a relatively large needle valve opening. This makes it possible to obtain a reliably regulated small rate of flow.

The automatic electrical control device above referred to is shown in Figs. 3, 4, 5, 6 and 7 of the accompanying drawings.

Referring to the wiring diagram of the automatic control device as shown in Fig. 6, the primary coil 60 of a transformer 75 and a thermostatically controlled mercury switch 63 are connected in series across an alternating current line provided with a master switch 80. A secondary winding 61 of the transformer 75 is proportioned to give a terminal voltage of approximately two and one-half volts. Two parallel thermostatic bi-metallic strips 62 are joined at one end and are connected across secondary winding 61. These strips are coiled so as to uncurl when cooled, thereby tilting the glass enclosed mercury switch 63 and causing the mercury 64 to run to the end of the switch 63 as shown. The mercury 64 forms an electrically conductive connection between the terminal 66 of the primary winding 60 and the source of alternating current, closing the circuit of the primary transformer winding 60. The flow of current through the primary winding 60 induces a current in the secondary transformer winding 61. This induced current flows through the bi-metallic strips 62, heating them so that they uncurl and open the switch 63. Thus, the current flows in the transformer a short time while the bi-metallic strips 62 are being heated, followed by an interval in which the strips are allowed to cool and no current flows in the circuit.

A tertiary transformer winding 68, giving a terminal voltage of 15 volts, is used to operate the solenoid controlled automatic electric oilers. One terminal of this tertiary winding 68 is grounded and the other terminal 70 passes to the ungrounded terminals of the solenoids in the oiler units. The line 73 connecting this terminal 70 with the oiler units is provided with a fuse 71. A suitable incandescent lamp 72 is connected between this line 73 and a ground so that it will be lighted whenever current flows in the oiler line 73. This provides an easily seen indicator by which to observe the operation of the control circuit.

Figure 3:
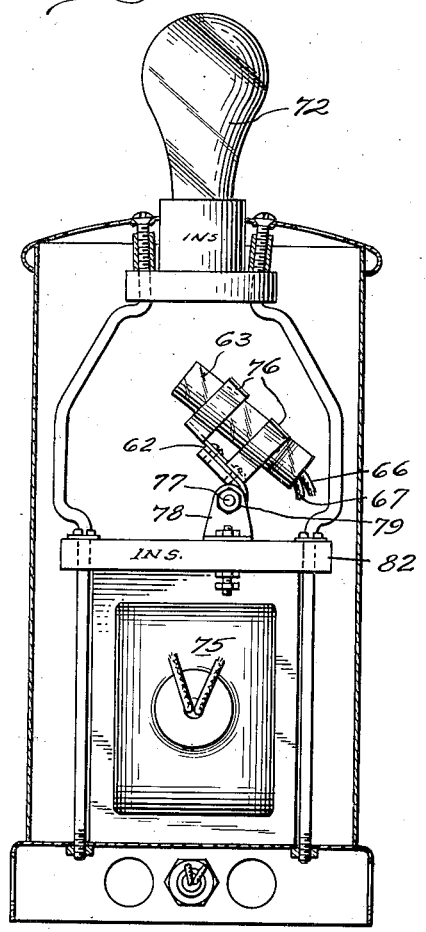
Fig. 3 shows a cross-sectional view of the central electrical control to be used in regulating the oiler shown in Figs. 1 and 2.
Figure 4:
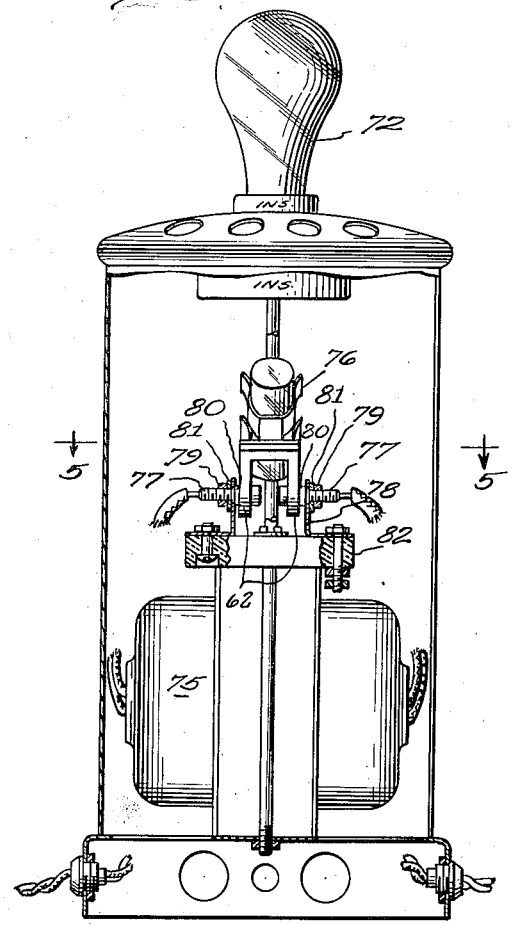
Fig. 4 shows a cut-away left side view of the electrical control device.
Figure 5:
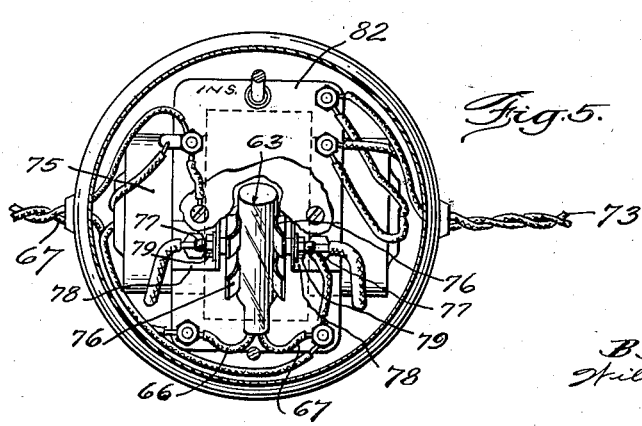
Fig. 5 shows a cross-sectional view of the control device along the line 5—5 of Fig. 4.

Referring to Figs. 3 and 4. In Fig. 3 a side view of the mercury switch 63 is shown. It is mounted on the bi-metallic strips 62 by brackets 76. Bi-metallic strips 62 are secured to stubs 77 mounted on brackets 78. These stubs are threaded and provided with nuts 79 and lock washers 81 to hold the thermostatically controlled mercury switch assembly in proper adjustment. Brackets 78 are mounted on a non-conducting base 82 placed above the transformer 75 to make a compact control unit.

It has been found convenient to adjust the thermostatically controlled switch so that the primary transformer circuit opens at approximately 300° Fahrenheit and closes at approximately 250°. It has been found desirable for many purposes to adjust the combined resistance of the bi-metallic strips 62 and the primary transformer winding 61 so that the above 50° temperature rise occurs in approximately three seconds, and to so construct the bi-metallic strips 62 so that they cool from 300° to 250° in approximately sixty seconds. With the above construction current flows in the oiler control circuit 73 approximately one-twentieth of the time. As the valve 46 is open only when current flows in the control circuit 73, a small rate of average flow may be obtained with a needle valve opening of approximately twenty times the size used in a similar oiler with but a single valve. Thus the continual clogging and erratic rate of flow of prior devices is eliminated, and a much more sensitive and dependable adjustment is achieved.

If an electrically operated machine is to be lubricated, the oiler control device may be connected in the circuit so that the flow of lubricant from the oiler is started and stopped simultaneously with the machine. This safeguards against damage from the operation of the machine parts without lubrication and prevents loss of lubricant when the machine is not being operated, guarding against carelessness of the operator. If the machine parts to be lubricated are driven by a slip belt, clutch or other mechanical drive, a switch energizing the oiler control device may be connected to the lever or other device operating the belt or clutch and the same result is obtained.

Inasmuch as the bi-metallic strips are cold when the circuit is first completed, and must reach 300° before the circuit is opened, a long period of initial flow is provided upon the starting of the machine.

The period of operation of the oiler is but slightly affected by temperature inasmuch as the temperatures of 250° and 300° are substantially above room temperature. Further, room temperature is relatively constant. It will be noted that as the rate of cooling of the bi-metallic strips 62 increases, the period that the oiler is out of operation decreases. A more rapid rate of cooling is caused by a drop in room temperature. This drop in room temperature in turn increases the viscosity of the oil or other lubricant. It is thus seen that as the viscosity of the lubricant increases, the period that the lubricant flows in the oiler is also increased, thereby promoting a more uniform flow of lubricant over a range of temperatures.

The oiling system above described is a very marked improvement over previous oiling systems. The solenoid control for the unit oiler contains few more parts than a manually controlled sight feed oiler. These parts are a small and easily manufactured solenoid winding, a plug which may be cut from standard material, a valve member so designed that it may be manufactured on a screw machine, and cheap and easily manufactured electrical connections. The electrical control device contains an inexpensively manufactured and operated transformer. No intricate mechanical operations are necessary in assembling the mercury switch and thermostatic control. The reliable operation at small rates of flow, comparative freedom from the necessity of adjustment, avoidance of the danger of injury to the machine from operation without sufficient lubrication, and economy in the use of lubricant constitute material advantages which more than offset the slightly greater complexity of this system.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. In an electrically controlled lubrication system comprising an electrically controlled lubricating device adapted for supplying lubricant to a machine when and only when the control circuit therefor is energized, an automatic electrical control device for periodically making and breaking the control circuit of said system and comprising a transformer having a primary winding connected across a source of current supply, a thermostatically controlled mercury switch in series with said primary winding, a bi-metallic thermostatic control for said switch to open said switch when said bi-metallic thermostatic control reaches a temperature substantially above room temperature and to close said switch at a somewhat lower temperature, a heating circuit for said bi-metallic thermostatic control, a secondary transformer winding for supplying current to said heating circuit, and a tertiary transformer winding for supplying current to the electrical controls for said lubricating device.

2. In a lubrication system comprising an electrically controlled lubricating device adapted for supplying lubricant to a machine when and only when an electrical control circuit therefor is energized, a circuit for controlling the supply of current to the controls of said device, a switch to open and close said circuit, a thermostatic control for said switch to open it when said thermostatic control attains a temperature substantially above room temperature and to close it at a somewhat lower temperature, an electrical heating means for said thermostatic control, said heating means being connected in said circuit to heat said thermostatic control only when said circuit is closed, and an electrical connection in said circuit to supply current to the electrical controls of said lubricating device only when said circuit is closed.

3. In a lubrication system, the combination of an electrically controlled lubricating device having a control circuit and being adapted to supply lubricant to a machine only when said circuit is energized, and an automatic electrical control device to open and close said control circuit periodically, said control device comprising a transformer having a primary winding across a source of current supply, a switch in series with said winding, a thermostatic control for said switch to open it when said thermostatic control attains a temperature substantially above room temperature and to close it at a somewhat lower temperature; electrical heating means for said thermostatic control; electrical connections for supplying current to said heating means from the windings of said transformer; and electrical connections for supplying current from the windings of said transformer to said electrically controlled lubricating device.

4. In a lubrication system for an electrically operated mechanism, the combination of an electromagnetically controlled lubricating device to supply lubricant to said mechanism only when the electromagnetic controls of said device are energized, a cyclically operating electrical control circuit for supplying current to the electromagnetic controls of said lubricating device during a small portion only of each cycle, means in said lubricating device for controlling the rate of flow of lubricant therefrom, and means forming a part of said electrical control circuit effective to supply current to said electromagnetic controls for an appreciably longer time during the first cycle of operation following an extended period of rest than during immediately following cycles.

ERNEST W. DAVIS.